United States Patent Office 2,959,602
Patented Nov. 8, 1960

2,959,602

TRIESTERS OF 9α-FLUORO-1,4,6-PREGNATRIENE-11β,17α,21-TRIOL-3,20-DIONE

David H. Gould, Leonia, and Elliot L. Shapiro, Irvington, N.J., assignors to Schering Corporation, Bloomfield, N.J., a corporation of New Jersey No Drawing. Filed Dec. 3, 1957, Ser. No. 700,304

3 Claims. (Cl. 260—397.45)

This invention relates to a new group of esterfied pregnatrienes and to processes for their manufacture. More particularly, this invention relates to polyesters of 9α-halogeno-1,4,6-pregnatriene-17α,21-diol - 2,11,20 - trione and 9α-halogeno-1,4,6-pregnatriene-11β,17α,21-triol-3,20-dione which are potent, long-acting anti-inflammatory agents and concomitantly exhibit little or no sodium retention.

The new and valuable esters may be represented by the following general formula:

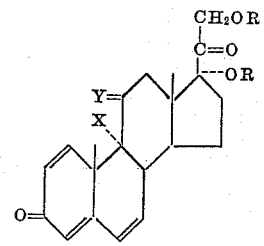

wherein X is a halogen having an atomic number less than 53; Y is a member of the group consisting of

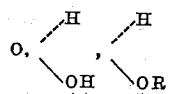

and R represents lower alkanoyl.

1,4,6-pregnatriene-17α,21-diol-3,11,20-trione and 1,4,6-pregnatriene-11β,17α,21-triol-3,20-dione (and their 21-esters) are known to have superior corticoid activity of the order of prednisone and prednisolone, particularly with respect to anti-inflammatory activity. It is known that the 9α-halo-, particularly the 9α-fluoro-, derivatives of the above-mentioned hormones are also potent glucocorticoids. These 9α-fluoro-analogues are even more active as mineralocorticoids, however, and thus cannot preferentially be used internally for anti-inflammatory therapy due to the resulting salt retention. Further, it is known that with compounds such as 6-dehydro-prednisone or 6-dehydro-prednisolone, acetylation of the 11β-hydroxyl groups decreases the activities of the parent substance to a great extent, resulting in an inactive or therapeutically useless substance. Surprisingly, the compounds of this invention show a substantial reduction of sodium retention with a simultaneous enhancement of anti-inflammatory activity over that of their non-esterified and non-halogenated ester analogues. A further unusual feature in the case of the 9α-halogeno-triene-triesters is that some of the manifold pharmacological activities of gluco-corticoids are also altered; e.g. eosinopenia and thymus involution have been severely decreased, leaving only a high level of anti-inflammatory action.

The compounds of our invention may be prepared by esterification methods such as with an acylating agent in the presence of an acid catalyst. In order to prepare the compounds containing an 11β-ester group, modification of the usual esterification methods must be employed. The polyhydroxy steroid is treated with an acylating agent such as acetic anhydride, isopropenyl acetate, propionic anhydride and the like, with a strong acid catalyst such as p-toluene sulfonic or trichloroacetic acid. These esterifications are carried out under otherwise mild conditions of temperature to avoid rearrangements and side reactions. The starting compound is preferably the corresponding unesterified or partially esterified 9α-halogenated-polyhydroxy-steroid. For example, 9α-fluoro-1,4,6-pregnatriene-11β,17α-21-triol-3,20-dione may be triacetylated at the 11,17-positions to yield the corresponding triester.

An alternative route to obtain the compounds of this invention may be through esterification of the diene polyhydroxy analogues (thus protecting the secondary 11β-hydroxyl group), followed by reactions leading to the introduction of the double bond between the 6 and 7 carbon atoms. For example, 9α-fluoro-1,4-pregnadiene-11β,17α,21-triol-3,20-dione may be triacetylated at the 11,17 and 21-positions, followed by bromination on the 6-carbon and subsequent dehydro-bromination to give 9α - fluoro - 1,4,6 - pregnatriene - 11β,17α,21 - triol - 3,20-dione triacetate.

For esterification, lower alkanoic acids such as acetic, butyric, propionic, valeric, are preferred. However, we exclude only the stronger acids such as formic, trifluoroacetic, etc., which form extremely labile esters, which tend to easily hydrolyze even the hindered 11β-position. The esterification is catalyzed by any acid stronger than those having a $pK_A$ of 2, such as dichloroacetic, trifluoroacetic, sulfuric, phosphoric, methanesulfonic, p-toluenesulfonic, benzenesulfonic, hydrochloric and the like, but not those having oxidizing properties, such as nitric, chromic, periodic, and the like.

The following examples are illustrative of procedures for the preparation of the compounds of this invention, but are not intended to indicate the scope thereof, such scope being defined in the appended claims.

EXAMPLE 1

*9α-fluoro-6-dehydroprednisolone 11β,17α,21-triacetate*

A. 6β-BROMO-9α-FLUOROPREDNISOLONE 11β,17α,21-TRIACETATE

The requisite starting material, 9α-fluoro-prednisolone 11β,17α,21-triacetate, is prepared as described in the co-pending application of Arthur Nobile, Serial No. 700,263, filed on December 3, 1957.

9α-fluoro-prednisolone 11β,17α,21-triacetate (5.5 g.) is dissolved in 1500 ml. of carbon tetrachloride and then 100 ml. of the solvent is distilled. While the reaction mixture is kept under a blanket of argon, N-bromosuccinimide (2.53 g.) and benzoyl peroxide (0.075 g.) is added. The mixture is then refluxed and irradiated with a 300-watt projection bulb placed in a center well, until a negative test with starch-iodide paper is obtained (about 30 minutes). The reaction mixture is cooled and washed with water. The organic solvent layer is dried over magnesium sulfate, filtered and evaporated in an air stream to yield a residue of 6β-bromo-9α-fluoro-6-dehydroprednisolone 11β,17α,21-triacetate.

B. 9α-FLUORO-6-DEHYDROPREDNISOLONE 11β,17α,21-TRIACETATE

The compound prepared in Example 1A, 9α-fluoro-6-dehydroprednisolone 11β,17α,21-triacetate, is covered with 300 ml. of N,N-dimethylformamide, and argon is bubbled through the solution. After boiling for four hours, the solution is cooled and evaporated in a dish in an air draft. Water is added to the resultant residue, the insoluble portion filtered and chromatographed on activated magnesium silicate. The fractions eluted with 60:40 ether-hexane are crystallized from methylene chloride-hexane to give 9α-fluoro-6-dehydroprednisolone 11β,17α,21-triacetate.

EXAMPLE 2

*9α-fluoro-6-dehydroprednisone 17,21-diacetate*

9α-fluoro-6-dehydroprednisone 21-acetate is suspended in 30 parts of 1:5 acetic anhydride-acetic acid to which is added 0.15 part of p-toluenesulfonic acid. The mixture is shaken until clear and allowed to stand 48 hours at room temperature. The solution is poured into water and the resulting precipitate is filtered, washed with water, and dried in the draft oven. The residue is crystallized from acetone-hexane to yield 9α-fluoro-6-dehydroprednisone 17,21-diacetate.

EXAMPLE 3

*9α-fluoro-6-dehydroprednisolone 17α,21-diacetate*

9α-fluoro-6-dehydroprednisolone 21-acetate is reacted with acetic anhydride-acetic acid and p-toluenesulfonic acid in the manner described in Example 2. The product obtained on water precipitation is crystallized from acetone to yield 9α-fluoro-6-dehydroprednisolone 17,21-diacetate.

EXAMPLE 4

*9α-fluoro-6-dehydroprednisone 17α-propionate 21-acetate*

9α-fluoro-6-dehydroprednisone 21-acetate is reacted with 30 parts of 1:5 propionic anhydride-propionic acid and 0.15 part of p-toluenesulfonic acid in the manner described in Example 2. The product obtained from the water precipitation is crystallized from methylene chloride-hexane to yield 9α-fluoro-6-dehydroprednisone 17α-propionate 21-acetate.

EXAMPLE 5

*9α-bromo-6-dehydroprednisone 17α,21-diacetate*

9α-bromo-6-dehydroprednisone 21-acetate is reacted as described in Example 2. The crude product obtained on water precipitation is crystallized from acetone-hexane to yield 9α-bromo-6-dehydroprednisone 17α,21-diacetate.

EXAMPLE 6

*9α-chloro-6-dehydroprednisolone 11β,17α,21-triacetate*

The procedure of Example 2 is repeated using 9α-choro-6-dehydroprednisolone 21-acetate as starting material and 0.5 part of methanesulfonic acid as catalyst. After standing 72 hours at room temperature, the reaction is poured into water and the precipitate collected, dried, and crystallized from acetone-hexane to yield 9α-chloro-6-dehydroprednisolone 11β-17α,21-triacetate.

EXAMPLE 7

*9α-fluoro-6-dehydroprednisolone 11β,17α,21-tricaproate*

9α-fluoro-6-dehydroprednisolone is dissolved in 25 volumes of 1:1 caproic acid-caproic anhydride to which is added 0.5 part of p-toluenesulfonic acid. The solution is kept at room temperature for four days and is then poured into 5% aqueous sulfuric acid solution. After vigorous stirring for one-half hour, the mixture is extracted with methylene chloride twice, and the methylene chloride solution washed with dilute sodium bicarbonate until the washings are basic and then with water until the water layer is neutral. The organic solution is dried over anhydrous magnesium sulfate, filtered, and evaporated to dryness. The residue is crystallized from acetone-hexane to give 9α-fluoro-6-dehydroprednisolone 11β,17α,21-tricaproate.

We claim:

1. Compounds of the following general formula:

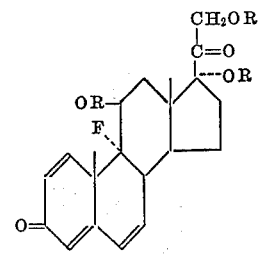

wherein R is a hydrocarbon lower alkanoic acid radical having from 2 to 6 carbon atoms.

2. 9α-fluoro-6-dehydroprednisolone 11β,17α,21-triacetate.

3. 9α-fluoro-6-dehydroprednisolone 11β,17α,21-tricaproate.

References Cited in the file of this patent

UNITED STATES PATENTS

| | | |
|---|---|---|
| 2,816,902 | Gould et al. | Dec. 17, 1957 |
| 2,819,264 | Gould et al. | Jan. 7, 1958 |

FOREIGN PATENTS

| | | |
|---|---|---|
| 750,330 | Great Britain | June 13, 1956 |